UNITED STATES PATENT OFFICE 2,067,176

PRODUCTION OF AMINO ALCOHOL DERIVATIVES

Henry Dreyfus, London, England

No Drawing. Application August 22, 1932, Serial No. 629,898. In Great Britain September 18, 1931

10 Claims. (Cl. 260—99.12)

This invention relates to the manufacture of new organic compounds which are particularly of value as sizing, wetting, cleansing or detergent, dispersing, and emulsifying agents in the treatment of substances or materials in general, and also in the treatment of textiles and fibres in general, for which purpose the new compounds are also of value as de-electrifiers, wetting agents and detergents.

According to the present invention, the new organic compounds are prepared by combining resin acids or naphthenic acids with amino alcohols. The compounds may be of the type of simple addition products in which the amino alcohol adds itself to the resin or naphthenic acid, or of the type of condensation product produced by the combination of the acid with either the amino group or the alcoholic group of the amino alcohol or both, with elimination of water. Furthermore, the products obtained by acidylation of the amino group with the resin or naphthenic acid radicle may have the free alcoholic group substituted, as for example by another acid radicle.

As amino alcohols for use according to the present invention I may mention mono-, di- and tri-ethanolamine, and the commercial product known as ethanolamine which is a mixture of two or even three of the ethanolamines, propanolamine, diaminopropanol, di-oxy-propanolamine, butanolamine, pentanolamine and bodies similar to the di- and tri-ethanolamines wherein more than one hydrogen atom of the parent ammonia is substituted by a higher oxy-alkyl group, and also compounds in which one or two hydrogen atoms of the parent ammonia is or are substituted by an oxy-alkyl group, and one or two of the remaining hydrogen atoms by a group of a different type, as for example a simple alkyl group, or an $\omega$-amino-alkyl group. Such bodies may be made for instance by the action of ethylene oxide upon ethylene diamine. As the resin and naphthenic acids for combinining with the amino alcohols I may mention all the naphthenic acids, and particularly the naphthenic acids which can be extracted or prepared from Baku petroleum and the resin acids of colophony, Congo copal, kauri copal, Manila copal and Zanbizar copal. In addition the present invention further includes the use of the synthetic resin acids, for example those obtained by condensation of natural resins with phenol aldehyde condensation products and with other synthetic resin products, as for example the glyptal and urea synthetic products and the products obtained from aliphatic di-carboxylic acids, e. g. sebacic acid, by condensation with alcohols, and in addition the purely synthetic acid resins containing a free carboxy group, for example the products obtained by condensation of salicyclic acid or other phenol carboxylic acids with formaldehyde or other aldehydes.

The products produced as above may be converted by sulphonation into substances which have a still stronger dispersing action or wetting action upon solids and upon textile materials. Such sulphonation may be effected either after, during or before combination of the naphthenic or resin acids with the amino alcohols. In fact the invention envisages the combination or condensation of an already sulphonated amino alcohol with a resin or naphthenic acid or of an already sulphonated resin or naphthenic acid with an amino alcohol. It is preferable, however, to effect the sulphonation simultaneously with or after the combination of the resin or naphthenic acid with the amino alcohol. The sulphonation may be effected by simple treatment with strong sulphuric acid, or with chlor-sulphonic acid or with sulphur trioxide, of the compounds of the resin or naphthenic acid with the amino alcohol or one or more of the reagents taking part in the combination. The stronger sulphonating agents such as chlor-sulphonic acid and sulphur trioxide have the advantage that they can produce more highly sulphonated products. The sulphonation products manufactured according to the present invention, and particularly the highly sulphonated products, are even more stable towards hard water than are the simple unsulphonated products.

The combination of the amino alcohol with the resin or naphthenic acid may be brought about by simple mixing of the compounds, but is preferably facilitated by heating the compounds, especially when it is desired to produce a condensation either with the amino group or the alcohol group or both of the amino alcohol. Further, condensation may be much facilitated by employing a condensing agent, as for example sulphuric acid or phosphoric acid. As already indicated sulphuric acid may be employed to bring about a simultaneous sulphonation of the product.

When the acid is a di- or poly-carboxylic acid, as in the case of most of the naphthenic acids, and in the case of some of the synthetic resin acids, as for example the condensation products of salicylic and like acids with formaldehyde, the amino alcohol may be caused to combine with all or only part of the carboxy groups. This may be brought about by suitable adjustment of the proportions of the reagents. When only part of the carboxy groups are reacted or closed by means of the amino alcohols, the remaining carboxy group or groups may be converted into salts, as for example with caustic soda or potash or ammonia, or into further esters as desired.

Instead of combining the amino alcohol directly with a synthetic acid resin as described above, the amino alcohol may first be combined with one of the reagents used to produce the resin, and the product then reacted with the other reagent or reagents to produce directly the amino alcohol compound of the resin acid. Thus for instance an amino alcohol, for example mono- or di-ethanolamine, may be caused to react with salicylic acid or other aromatic oxy-carboxylic acid, and the product then treated with formaldehyde, furfural or other suitable agent for forming a resin with salicylic acid.

For de-electrifying and similar purposes the compounds of the present invention may conveniently be applied in solution in suitable mineral oils, and their formation may actually take place in this medium, the amino alcohols and resin or naphthenic acids being added in suitable proportions and then caused to react. Some oils, particularly those of Russian origin, have a natural content of naphthenic acids, and when these are used it may be unnecessary to add more acids, and the proportion may even be reduced by the addition of acid-free oils or other liquids.

Furthermore the combination or condensation of one resin-forming reagent with the amino alcohol may be brought about simultaneously with the resin-forming reaction itself.

As previously indicated the new products are especially of value as sizing, wetting, cleansing, emulsifying and dispersing agents, and as de-electrifiers in the arts. Some of the products lend themselves more particularly to one purpose, and other products to other purposes. For instance, the products obtained by condensation of an amino alcohol with part of the carboxy groups of a di- or poly-carboxylic naphthenic or resin acid and also the salts of such products have more powerful emulsifying or dispersing properties than the products in which all carboxy groups are reacted, and similarly all the sulphonation products of the present invention are highly valuable as emulsifying and dispersing agents. All the products are useful as wetting and cleansing agents. As regards de-electrifying properties the products which are of greatest value are the simple addition products of the amino alcohols with the resin and naphthenic acids, and also the condensation products in which the amino group is reacted with the naphthenic or resin acid.

The products, and especially those containing free amino groups, are also of value as agents for preventing acid fading of dyestuffs on textile materials and particularly on textile or other materials made of or containing cellulose acetate or other organic derivative of cellulose which have been coloured or are to be coloured with amino- or alkyl-amino-anthraquinones.

The products are further useful as lubricants, and especially those products which act as good de-electrifiers. Thus the products may be used as lubricants for textiles in weaving, knitting, winding or winding and twisting generally, and especially winding or winding and twisting of artificial filaments, for example continuously with their production either by dry or wet spinning processes. In wet spinning the products may actually be incorporated in the coagulating bath and may be carried out of the bath by the filaments or like products so as to exert their lubricating action. The new products may therefore be used in textile practice in place of known lubricants, which are liable to oxidation to acidic products, and hence in this application may be said to prevent acid fading of dyestuffs by removing the cause thereof. For de-electrifiers and lubricants, the bodies may be employed together with diethylene glycol, glycerine or other di- or poly-hydric alcohols.

As wetting agents the products of the invention are of greatest value in the wetting of solids so as to form pastes, for example in printing pastes and in commercial pastes containing vat and other insoluble dyes which have subsequently to be converted into solutions or dispersions. In the textile industries the products are of value in any wet treatment of textiles, as for example in mercerizing of cotton and other cellulosic fibres, dyeing or fibres of all kinds, the fulling of wool, the carbonizing of cotton and cellulosic fibres, and the killing of skins. As wetting agents the new substances are further of importance in the crêpe twisting of artificial and other filaments or yarns in order to produce crêpe fabrics. It is of great assistance in crêpe twisting to apply water or other wetting substance before or during twisting or between stages of the twisting. The products of the present invention facilitate such wetting. Furthermore in the manufacture of staple fibre, using for instance artificial filaments, and especially filaments of cellulose acetate or other cellulose derivatives, it is of advantage to cut a compact bundle of filaments which has been wetted with water. Such wetting may again be facilitated by the wetting agents of the present invention.

As dispersing agents the products are particularly of value in the conversion of water-insoluble dyestuffs into dispersion for use in dyeing, printing and stenciling of textile fibres, and in particular fibres of cellulose acetate or other organic derivatives of cellulose for which the water-insoluble dyestuffs are to-day of most value. The products may also be used for the purpose of dispersing lakes, insoluble pigments and pigment dyestuffs into suitable dispersions for use as aqueous paints and the like.

As de-electrifiers the products have most importance in connection with textile fibres which are liable to electrification, as for example silk, wool and the organic esters and ethers of cellulose and also in the treatment of films, sheets and the like of esters or of ethers of cellulose or other materials which are liable to electrification. In the case of the artificial filaments or other materials such as those made of cellulose derivatives the de-electrifiers of the present invention may be applied to the materials after manufacture or dissolved or dispersed in the solutions used in the manufacture of the materials.

The products obtained according to the present invention are also of value in the sizing both of natural textile fibres and also of artificial fibres having a cellulosic base, such as those obtained by the viscose, cuprammonium or nitro-cellulose processes, and those having a base of an organic derivative of cellulose, for example, cellulose acetate.

While in the above description particular examples have been given of application of the new substances, it is to be understood that the invention includes their use generally in the arts.

The following examples illustrate the invention but it is to be understood that they do not limit it in any way:—

Example 1

Equivalent quantities of mono-ethanolamine and abietic acid are heated together at from 90°–100° C. for about 30 minutes and a dark-coloured liquid product is obtained, which solidifies on cooling and is very suitable for use as a size when dissolved in an appropriate solvent, e. g. xylene.

If desired, tri-ethanolamine may be substituted for the mono-ethanolamine used in the above example, and a similar product is obtained.

Example 2

Equivalent quantities of mono-ethanolamine and naphthenic acid are refluxed t gether in a suitable solvent, e. g. alcohol, for from 8–12 hours. The solvent is then removed, for example by distillation, and a product is obtained which may be employed as a size or wetting agent and for other similar purposes.

If desired, a catalyst may be present in either of the above examples, and, if sulphuric acid is used, by adjusting the proportions and other conditions of the reaction a sulphonated product may be obtained.

Example 3

The following example shows the use of the products obtained according to the present invention in the sizing of textiles.

A solution in xylene of from 30–50% concentration of the compound obtained according to Example 1 is prepared and applied to a cellulose acetate yarn by contacting the yarn during its transfer from one supporting device to another with a roller dipping into the xylene solution.

The size may also be applied by immersion methods, but in this case a weaker solution, e. g. 15%–25% is preferably used.

Example 4

The following example shows the use of the products obtained according to the present invention in the dyeing of textiles with water-insoluble dyestuffs.

A blue violet shade may be obtained upon a cellulose acetate woven fabric in the following manner. A dyebath is prepared by grinding together about 4 lbs. of the product obtained by reacting naphthenic acid with ethanolamine in the presence of sulphuric acid and 1 lb. of 1-amino - 4 - methylamino anthraquinone, stirring the mixture into 10 gallons of boiling water and straining the dispersion into 300 gallons of water in a suitable dyeing machine. 100 lbs. of fabric are then entered at 25–30° C., the temperature raised during 30 minutes to 75° C. and the goods worked at this temperature for 1 hour. They are then removed, washed and dried.

What I claim and desire to secure by Letters Patent is:—

1. Process for the production of organic compounds which comprises condensing an amino alcohol with an acid selected from the group consisting of synthetic resin acids and naphthenic acids.

2. Process for the production of organic compounds which comprises condensing an alkylolamine with an acid selected from the group consisting of synthetic resin acids and naphthenic acids.

3. Process for the production of organic compounds which comprises condensing an ethanolamine with an acid selected from the group consisting of synthetic resin acids and naphthenic acids.

4. Process for the production of organic compounds which comprises condensing an amino alcohol with a synthetic resin acid.

5. Process for the production of sulphonated organic compounds which comprises condensing an amino alcohol with an acid selected from the group consisting of resin acids and naphthenic acids and sulphonating the product.

6. Process for the production of sulphonated organic compounds which comprises condensing an ethanolamine with an acid selected from the group consisting of resin acids and naphthenic acids and sulphonating the product.

7. Process for the production of sulphonated organic compounds which comprises condensing an amino alcohol with an acid selected from the group consisting of resin acids and naphthenic acids in the presence of a sulphonating agent.

8. Process for the production of sulphonated organic compounds which comprises condensing an alkylolamine with an acid selected from the group consisting of resin acids and naphthenic acids in the presence of a sulphonating agent.

9. Sulphonated condensation products of amino alcohols with acids selected from the group consisting of resin acids and naphthenic acids.

10. Sulphonated condensation products of alkylolamines with acids selected from the group consisting of resin acids and naphthenic acids.

HENRY DREYFUS.